March 11, 1969     G. J. SEBESTA ET AL     3,432,622

SUB-MINIATURE SOUND TRANSDUCERS

Filed May 10, 1965

INVENTORS,
GEORGE J. SEBESTA
RICHARD W. CARLISLE

BY *Richard A. Marsen*

THEIR ATTORNEY

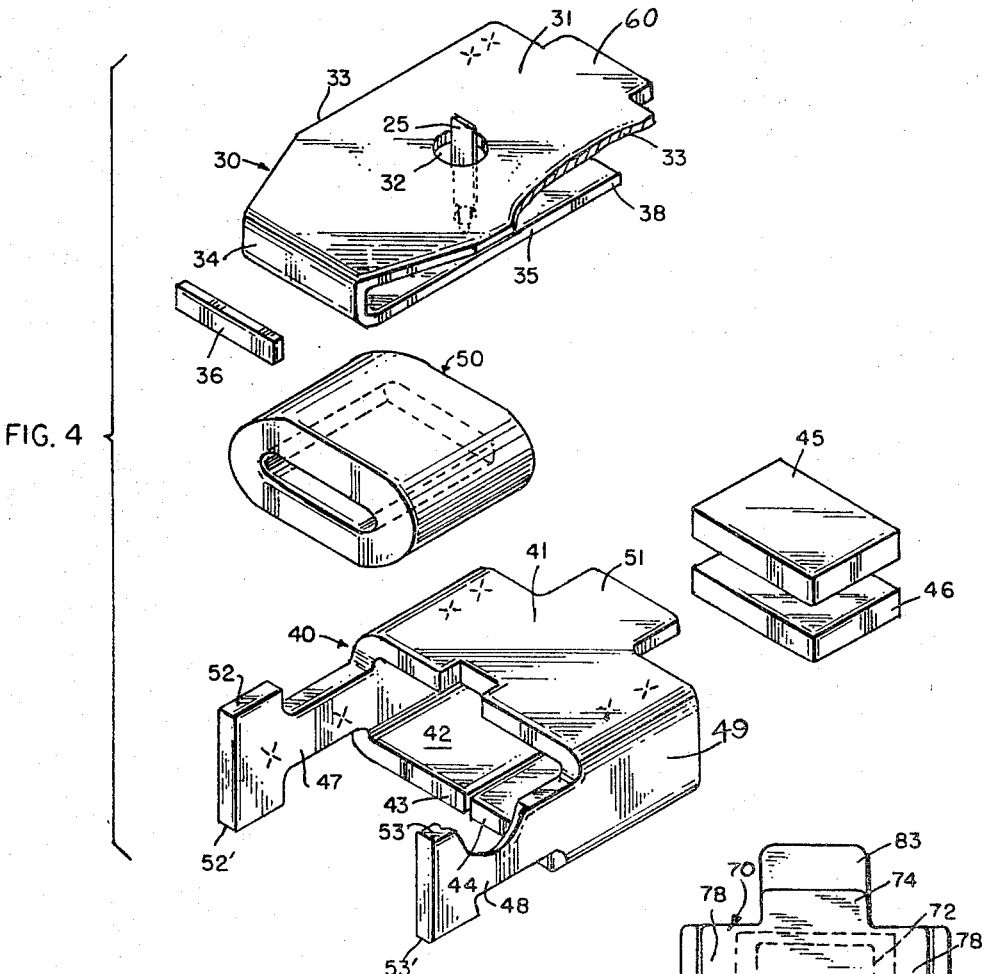
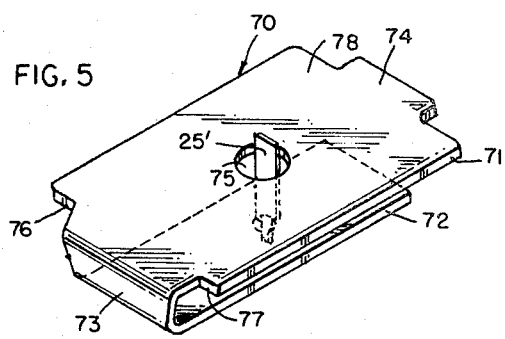
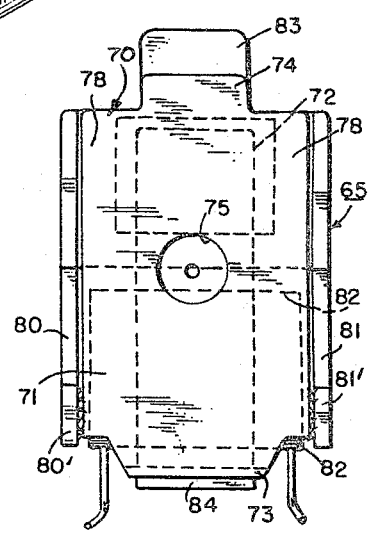
FIG. 4
FIG. 5
FIG. 6
INVENTORS,
GEORGE J. SEBESTA
RICHARD W. CARLISLE
BY Richard P. Marsen
THEIR ATTORNEY March 11, 1969  G. J. SEBESTA ET AL  3,432,622
SUB-MINIATURE SOUND TRANSDUCERS
Filed May 10, 1965
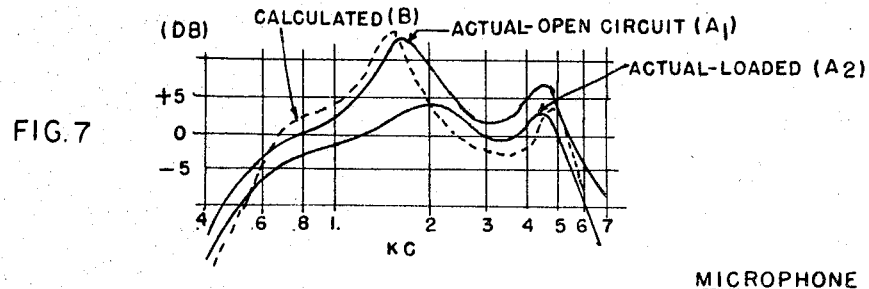
FIG. 7
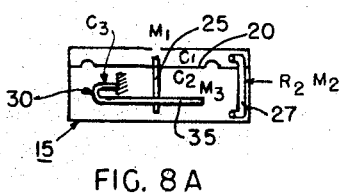
FIG. 8A
MICROPHONE
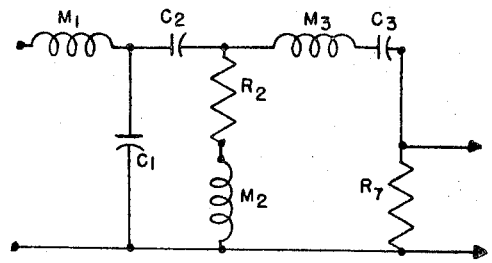
FIG. 8B
FIG. 9
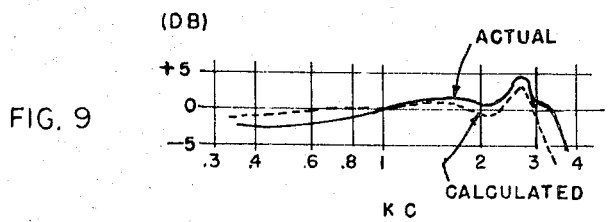
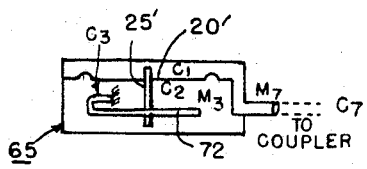
FIG. 10A
RECEIVER
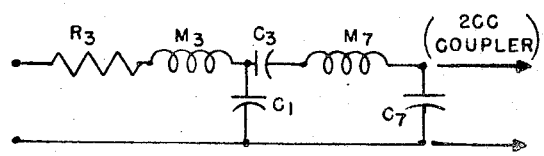
FIG. 10B
INVENTORS,
GEORGE J. SEBESTA
RICHARD W. CARLISLE
BY Richard P. Marsen
THEIR ATTORNEY

United States Patent Office 3,432,622
Patented Mar. 11, 1969

3,432,622
SUB-MINIATURE SOUND TRANSDUCERS
George J. Sebesta, Huntington Bay, and Richard W. Carlisle, Greenburgh, N.Y., assignors to Dyna Magnetic Devices, Inc., Hicksville, N.Y., a corporation of New York
Filed May 10, 1965, Ser. No. 454,377
U.S. Cl. 179—115   9 Claims
Int. Cl. H04r 7/04, 7/16

ABSTRACT OF THE DISCLOSURE

A transducer arrangment for miniature constructions, as microphones or receivers, with compact efficient electromagnetic configuration. Contains an endless loop or band, with two magnet blocks in spaced array therein. The armature is in U-form supported at one end by the band, and its free end in operative position between the magnets. Two members extend from the pole-piece band generally parallel to the armature for significant magnetic coaction. Also, the two members are formed to precisely locate the transducer in its casing, and to pre-position the diaphragm thereon.

---

This invention relates to electro-acoustic sound transducers, and more particularly to tiny novel microphones and receivers for use in hearing aids of the eye-glass, and adjacent to the ear and in-the-ear types.

In accordance with one version of the present invention, the transducer is essentially self-contained, being effectively operable in a housing of magnetic or even plastic composition and optical size. Its motor element and magnetic structure are uniquely constructed of minute components, without sacrifice in transducing efficiency. The resultant transducer volume is smaller than that of any other in the prior art, yet with no diminution in performance, sensitivity, stability or frequency characteristic. The basic novel magnetic and mechanical construction and principles hereof are similar for both the microphone and earphone receiver, as will be set forth hereinafter.

The magnetic configuration of the invention transducers provide highly efficient interlinkage of the unidirectional (DC) and alternating (AC) flux paths. Thus, an alternating current applied to the transducer coil produces an optimum corresponding alternating force on the armature when the unit is used as a sound generator or receiver. Conversely, an optimum voltage is generated when the device is used as a microphone. The DC and AC magnetic flux paths hereof are each constructed with relatively low reluctance. The pole piece contains permanent magnets at one end, and has lateral extensions along the sides. The armature is mounted in the pole piece, between its parallel side arms. The armature coil is supported by the arms in operative relation with the armature.

In the exemplary embodiment the armature has a U-shaped, or folded configuration with two arms. One arm end is affixed to the central section of the pole piece. The remainder of the armature is thereby maintained in a compliant relation, and is proportioned to be suitably vibratile. The armature coil surrounds a section of the free arm. The lateral extensions of the pole piece straddle the armature, and are magnetically related thereto for completing the AC flux path thereof. The extent of such magneic coaction is made greater in the construction of the receiver than in the microphone, for more effective performance as will be set forth. The transducer components hereof are so shaped and disposed as to bounded within a simple rectangular shape adapted for use in a sub-miniature hearing aid.

The above and further features, objects and advantages of this invention will become more apparent from the following description of exemplary embodiments thereof, illustrated in the accompanying drawings, in which:

FIG. 4 is an exploded view, in perspective, of the components of the electro-magnetic assembly of the microphone.

FIG. 5 is a perspective illustration of the armature of the receiver of FIG. 6.

FIG. 6 is a plan view of the exemplary receiver.

FIG. 7 is a set of frequency characteristic curves of the microphone unit.

FIG. 8A is an equivalent mechanical representation of the microphone; and FIG. 8B, the electrical counterpart thereof.

FIG. 9 is a set of frequency characteristic curves of the receiver unit.

FIG. 10A is an equivalent mechanical representation of the receiver; and FIG. 10B, the electrical version thereof.

Figure 1:
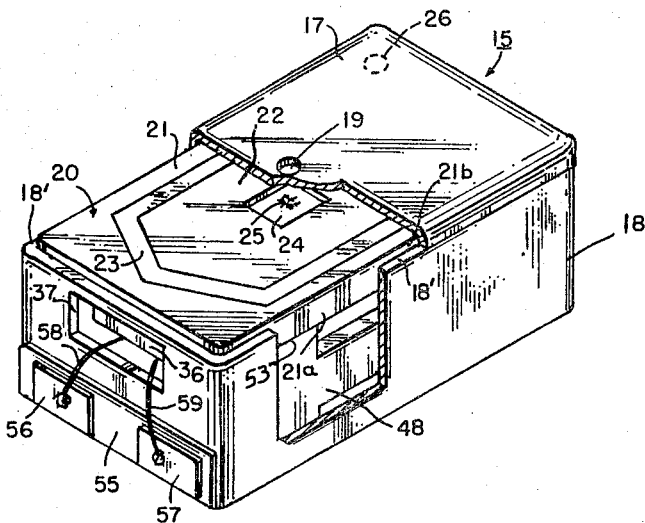
FIG. 1 is a perspective view of an exemplary microphone, with the cover partially broken away.

The exemplary microphone 15, illustrated among FIGS. 1 to 4, comprises a rectangular-shaped casing 18 with a shallow cover 17. The cover 17 abuts edge to edge with case 18, and is suitably secured in place. Cover 17 may of course overlap the case with a snug fit. The casing and cover are preferably of high-permeability material. A central aperture 19 in the cover establishes acoustic coupling from the exterior to diaphragm 20 across the front-cavity air space between the diaphragm and cover 17. The diaphragm assembly 20 is arranged to fit within the side walls of the casing, at the upper level therof, as seen in FIG. 1.

The diaphragm assembly 20 is a self-contained component, composed of a metal outer-frame 21 with a depending flange 21a along its perimeter that snugly fits into the casing. There are three support regions just below the casing edge for stable positioning of the diaphragm, as will be described. The central vibratory portion 22 of the diaphragm and its frame 21 are of aluminum foil. The foil elements 21, 22 are laminated to a thin polyether film, such as "Mylar," to constitute an assembly. The thin flexible film track 23 is 0.025" wide in the exemplary unit. The track 25 of film pliantly supports the portion 22, and may be of beaded shape. After the diaphragm is positioned in the casing, a central slit or pocket 25 therein is attached with the upper end of the drive pin 25, as with epoxy cement.

An aperture indicated at 26 at one corner of the diaphragm connects with the upper opening of a Thuras tube (see FIG. 8A). Such vent tube (27) is used to enhance the low frequency response of the transducer in a manner well known in the art. This tube is mounted in the end region 26' where ample space is present due to the invention structural configuration. In the microphone 15 hereof the Thuras tube has a diameter of 0.018", with the functions of providing atmospheric pressure equalization between the front-cavity and the cavity back of the diaphragm 20, as well as acoustic coupling inertance for the lower frequency response enhancement. This latter function is described hereinafter in connection with FIGS. 7, 8A and 8B.

The basic magnetic structure of the invention transducer comprises a folded U-shaped armature 30 that is mechanically and magnetically interrelated with a unitary folded yoke-shaped pole piece 40. The base end 31 of the armature is relatively wide, and is affixed to the top section 41 of the pole piece. A plurality of spot-welded joints firmly secures regions 31 and 41, as indicated by x-marks in FIG. 4. A clearance hole 32 is made in the upper armature arm 33 for the drive-pin 25 central of the microphone. Further along arm 33 the width becomes narrowed gradually, tapering to the fold region 34. The lower arm 35 is rectangular, or extends with a slightly narrowing taper from the fold 34. A small aperture in arm 35, below clearance 32, is used to suitably affix the lower end of drive pin 25, as with epoxy.

The described and illustrated configuration of armature 30 for the microphone thus enables it to flex throughout a major portion thereof. The material used is of relatively high permeability, such as an iron-nickel alloy containing approximately 75% nickel. This provides optimum AC permeance and consequent good generated voltage. A small bar 36 is welded to the armature across the outer section of its fold 34. The bar 36 is adjacent a rectangular opening 37 at one end of the casing 18. By inserting a small tool in opening 37, the air gaps between the tip 38 of arm 35 and the permanent magnets are readily and delicately adjusted. This is accomplished by slight displacements of the bar 36, which in turn bends the armature. Stable gap adjustments of the order of one ten-thousandth of an inch are feasible thereby, for maximum efficiency and output and minimum DC flux saturation in the armature.

The pole piece 40 is bent-up and folded out of a flat form. The pole piece is made of high-permeability material. The exemplary component 40 is of 0.016" thick metal, and of unitary construction. The rear section of the pole piece is formed into a generally rectangular enclosure 42 in band-form. The opposed edges of lips 43, 44 on the bottom are spaced apart with a clearance of about 0.002". We have found this more suitable than a butt or overlapping joint. There is no residual bump or step, and the air gap thereat is bridged by the magnet attached thereover; see FIGS. 3 and 4.

The permanent magnets 45, 46 are of rectangular cross-section, and good permeance and DC coercive force. We have found that Alnico VIII and Lodex 32 magnets most suitable, in view of the small bulk required, and their minimal AC reluctance characteristic. The magnets 45, 46 are secured to the pole piece 40 in spaced relation within enclosure 42, by a polyester cement as epoxy or by solder. The reed tip 38 is positioned centrally of the space between the magnets, and forms air gaps therewith. The pole piece 40 has two parallel lateral extensions 47, 48 along the sides of the assembly. These extensions serve as low reluctance AC and DC flux paths for the armature 30 and coil 50 magnetic array.

Figure 2:
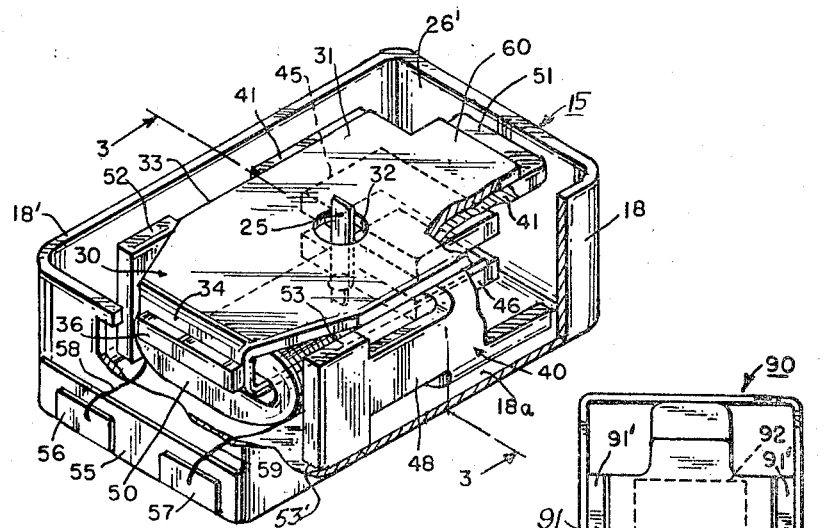
FIG. 2 is a perspective illustration of the microphone of FIG. 1, showing its interior construction.
Figure 3:
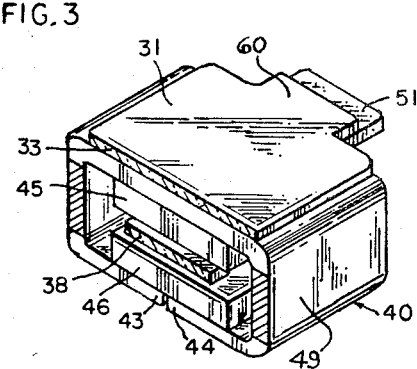
FIG. 3 is an isometric illustration taken along the line 3—3 of FIG. 2.

The coil 50 is supported in the open region between the lateral legs 47, 48. Coil 50 is suitably cemented to the interior of legs 47, 48 as with epoxy dots, at spots such as indicated on leg 47 by x-marks in FIG. 4. The coil is first slipped over the lower reed arm 35 to its position near fold 34, as seen in FIG. 2. The armature 30, pole piece 40 and coil 50 are thus precisely, stably, and ruggedly assembled as a unitary mechanical and magnetic device. The pole piece 40 is fitted into case 18, touching its side walls and bottom for mechanical stability and magnetic coaction therewith. The side walls 49, 49 of the pole piece are made flush or contiguous with the adjacent side walls of the can or casing 18. The bottom surfaces 52', 53' of legs 47, 48 as well as the bottom of the lips 43, 44 of the pole piece are arranged in a common plane to readily mount as an assembly on the bottom 18a of the casing. The leg bottoms 52', 63' thus have the important function as bottom locators for the armature-pole piece assembly. Leg bottoms 52', 53' together with the bottom faces of lips 43, 44 are proportioned to set and maintain this assembly properly parallel with the case bottom. The assembly is suitably cemented to the case in such relation, as may be seen in FIG. 2.

A tab 51 extends to the rear, centrally of the pole piece 40. It also touches the rear wall of casing 18 for magnetic coaction. The legs 47, 48 have projections 52, 53 respectively up to the level of tab 51. These top flat surfaces 51, 52, 53 serve as individual spaced supports for the frame 21 of diaphragm 20. As seen in FIG. 1, the flange 21a of the diaphragm assembly 20 mounts on the top flat (53) of pole piece leg 48. Flats 52 of leg 47, and the flat top of tab 51 are all on the same elevation. The diaphragm frame 21a is thus readily positioned by these supporting surfaces 51, 52, 53 at the proper height in the casing, and parallel to the armature 30.

Desirably, the horizontal surface of the diaphragm is located a small distance above the rim 18' of casing 18, to form a small ridge 21b just above rim 18'. After the diaphragm is sealed in position it thus forms a firm seat for the cover 17. Cover 17 can thus be readily mounted on casing 18 and stably sealed-in mechanically and acoustically. An effective yet inexpensive setting and mount for the diaphragm and cover are thereby effected. The overall AC reluctance of the device hereof is so low that no pole tips are required. The DC and AC flux paths interlink the armature throughout the portion of arm 35 that is within the coil 50. The AC flux is conducted around the outside of the coil principally to the pole piece legs 47, 48, and secondarily to the adjacent regions of the high-permeability casing 18.

By the avoidance of all but metal-to-metal joints, the mechanical stability of the device hereof is increased wherein the reduction of stiffness by the magnetic field can be set to approximately 25% of the intrinsic mechanical stiffness. The overall dimensions of the exemplary microphone 15 are very small by all prior art standards: 0.370" by 0.220", and 0.160" high inclusive of the cover. Connection is made to coil 50 through a circuit patch composed of a thin fiberglass strip 55 with two solder-on-copper layers 56, 57. The terminal leads 58, 59 of coil 50 are conductively terminated in solder bumps at 56, 57 respectively. A tab 60 extends from the rear of upper arm 33 of the armature 30. Tab 60 is shorter than pole piece tab 51, but is of same width. These tabs are thus arranged to readily and precisely jig-up arm 33 with the pole piece for its spot-welding thereto, as aforesaid. After assembly of the microphone and its final testing and adjustment, its end opening 37 is suitably sealed with a readily removable external patch (not shown).

The exemplary receiver 65 is shown in plan view in FIG. 6; its armature 70 in perspective in FIG. 5. Armature 70 is similar to that of the microphone, with two arms 71, 72 joined at fold 73, and a locating tab 74. A drive-rod 25' extends from lower arm 72 through a clearance hole 75 in arm 71. For the receiver application the upper arm 71 is preferably untapered towards the web 73, extending substantially uniformly longitudinally. Arm 71 abruptly narrows to join fold 73, through cut-outs 76, 77 at the adjacent corners. As the arm 71 remains effectively full width from its juncture to the pole piece region 78 to the web fold 73, it is thereby made relatively less compliant than the armature arm 33. The flexure of receiver armature 70 is substantially confined to the fold region 73 and to arm 72. There is therefore greater mechanical hinge stability and stiffness, with consequent freedom from undesirable resonance in the fold region 73. We have found it advantageous to the receiver frequency response to further mechanically stiffen the armature 70 operation by cementing the sides of its upper arm 71 to the adjacent portions of leg projections at 80', 81'. An iron-nickel alloy with approximately 50% nickel is suitable for the armature 70 of the receiver.

The pole piece for the receiver 65 is similar to the pole piece 40 described for the microphone 15. The legs 80, 81 extend longitudinally, and magnetically coact with the coil 82 and the adjacent edges of the armature 70. A tab 83 extends with and beyond armature tab 74. An adjusting bar 84 is secured at fold 73. It is to be noted that the greater width of upper arm 71 at the fold region, brings this armature portion closer to the lateral legs 80, 81 of the pole piece. This affords closer magnetic coupling for the flux paths therebetween, as compared with the microphone construction. Such closer magnetic coupling and concomitant greater stiffness are desirable features for the receiver unit.

Figure 11:
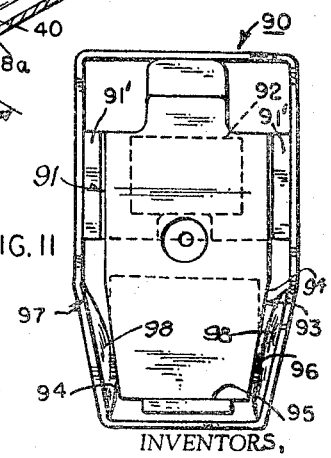
FIG. 11 is a plan view of a modified form of the invention.

FIG. 11 is a plan view of a modified microphone 90 construction. Its pole piece 91 consists of a suitable band forming an enclosure, corresponding to 42 in FIG. 4 for the magnets 92 therein with flat sides 91', 91' integral or secured thereto. The pole piece sides 91', 91' and its bottom face are cemented in position within the casing, magnetically contiguous therewith. The armature 93 hereof is the same as 30 of microphone 15, with its top arm tapered at 94, 94 towards the fold region 95. The coil 96 is suitably supported with respect to the lower free arm. The significant distinction of this microphone 90 is the omission of the lateral projecting sides or legs corresponding to 47, 48 of microphone 15 described hereinabove. The low reluctance AC flux return path is herein provided by unique shaping and magnetic coaction of the casing 97. Casing 97 is made of high-permeability metal, with sections 98, 98 opposite armature regions 94, 94 also tapered, as seen in FIG. 11. Sections 98, 98 are suitably shaped with the casing side walls. The casing 97 thus has sections in proximity to the armature 93 and coil 96 for efficient magnetic coaction therewith and provides a return magnetic path of low reluctance through to the pole piece 91.

FIG. 7 is a set of frequency characteristic curves of the exemplary microphone 15; and FIG. 9, of the receiver 65. The actual curve $A_1$ was taken with the microphone in open circuit; and actual curve $A_2$, while normally loaded. The zero reference axis is $-75$ db re one volt per dyne/cm.$^2$. The open circuit response $A_1$ is seen to peak at just below 2 kilocycles and also just below 5 kilocycles. The normally loaded performance is less peaked, and when the minute size of the microphone is considered, is seen to cover the speech frequency band rather well. The calculated curve B is for open circuit condition and corresponds with the actual companion curve $A_1$. Curve B is derived from the equivalent circuit per FIG. 8B, and the dynamic mechanical counterpart, FIG. 8A.

In FIG. 8A the diaphragm 20 is coupled by drive pin 25 to the reed 35. The vent tube 27 couples the front and back air chambers. The calculable compliance of the front chamber is $C_1$; that of the back chamber $C_2$. The compliance of the folded armature 30 is identified as $C_3$; its effective mass, as $M_3$. The vent tube 27 dynamically has a calculable resistance (based upon its orifice length and diameter), termed $R_2$; and an orifice inertance, $M_2$. The equivalent electrical diagram appears in FIG. 8B, as well understood by those skilled in the art.

We have found significant correlation between the actual and calculated characteristic for the invention transducers. Development time for actual models has been materially shortened by the use of an analog computer to provide the curves for selected parameter changes. The frequency characteristics of the exemplary receiver unit 65 are shown in FIG. 9. This too covers the speech band well. The principal limitation in the high-frequency cut-off is due to the characteristics of the tube $M_7$ used to conduct sound from the receiver to the ear-tip (not shown). It is noted that there is no aperture on the cover for the receiver case, it all being sealed except for the opening of the front-chamber (above the diaphragm 20') to the output tube $M_7$. The ear-tip coupler is indicated as 2 cc. with a compliance $C_7$.

Although the present invention has been described with particular embodiments, it is to be understood that variations and modifications thereof are feasible without departing from the spirit and scope of the invention as set forth in the following claims.

We claim:

1. A transducer comprising a pole piece forming an enclosure section, permanent magnet means secured to said pole piece within said enclosure, a pair of lateral members extending from said pole piece section in substantially parallel relation, an armature in U-form, one end of said armature being secured to said pole piece section supporting the armature outwardly and adjacent said lateral members, the other armature end being disposed with its free end within said enclosure adjacent said magnet means, and a coil winding arranged about a portion of said armature and between said lateral members, whereby a magnetically efficient self-contained transducer structure is provided with a plurality of low reluctance AC flux paths therethrough.

2. A transducer as claimed in claim 1, in which said coil winding is supported by said lateral members.

3. A transducer as claimed in claim 1, further including a casing of relatively high-permeability material, said transducer structure being mounted with its lateral members in close magnetic relation with said casing.

4. A transducer as claimed in claim 3, in which said lateral members are proportioned with locator elements for orienting the transducer structure within said casing.

5. A sound transducer as claimed in claim 3, in which the pole piece contains a plurality of spaced supporting areas in a predetermined plane for supporting edges of a diaphragm assembly in proper position on the transducer in the casing, said areas being provided by an extension of said pole piece section and by each of said lateral members.

6. A miniature sound transducer of the character described comprising a pole piece forming an enclosure section, two permanent magnet blocks of relatively low AC reluctance material respectively secured to said pole piece within its said enclosure section in spaced relation with an air gap therebetween, an armature in U-form with two arms joined at a fold region thereof, one end of one of said arms being secured to said pole piece section and supporting said armature outwardly therefrom, said enclosure section having a magnetically conductive closed-loop configuration arranged substantially perpendicular to the axis of the other armature arm the free end of which extends operatively into the air gap between said magnet blocks, a coil winding arranged about a portion of said armature, and a casing of relatively high-permeability material, said pole piece being mounted with said casing, walls of said casing having portions arranged in magnetic coaction with portions of said armature and pole piece.

7. A sound transducer as claimed in claim 6, in which the pole piece contains a plurality of spaced supporting areas in a predetermined plane for supporting edges of a diaphragm assembly in proper position in the transducer.

8. A miniature sound transducer as claimed in claim 6, in which said enclosure is constructed of flat material formed as a substantially rectangular section with said magnet blocks in parallel orientation therein with flat opposed inner faces, said free armature end being flat and extending across said magnet faces in substantial parallel relation therewith.

9. A transducer as claimed in claim 8, in which the pole piece contains a plurality of spaced supporting areas in a predetermined plane for supporting edges of a diaphragm assembly in proper position in the transducer, said areas being provided by an extension of said pole piece section and by each of said lateral members.

References Cited

UNITED STATES PATENTS 3,076,062  1/1963  Fener _____ 179—114

FOREIGN PATENTS 131,789  11/1946  Australia.

KATHLEEN H. CLAFFY, *Primary Examiner.*

A. McGILL, *Assistant Examiner.*